Patented Aug. 17, 1943

UNITED STATES PATENT OFFICE

2,327,188
TREATMENT OF PARAFFINS

Vladimir N. Ipatieff and Herman Pines, Chicago, Ill., assignors to Universal Oil Products Company, Chicago, Ill., a corporation of Delaware No Drawing. Application April 29, 1940, Serial No. 332,274

12 Claims. (Cl. 260—683.5)

This invention relates to the treatment of paraffins to produce therefrom more highly branched hydrocarbons and particularly to the treatment of butane of normal or straight chain structure.

More specifically the invention is concerned with a process whereby normal butane is converted into isobutane, the process involving the use of special catalysts and particular conditions of operation which favor isomerization so that the iso-compound is produced in relatively high yield.

Butanes are produced in considerable quantities in the oil refining industry. They occur in substantial amounts in natural gases (in which the normal compound usually predominates), in refinery gases which are evolved from crude petroleum storage tanks, and in the primary distillation of crudes; and they are also present in considerable percentages in the gases produced incidental to cracking heavy petroleum fractions for the production of gasoline. In the case of cracked gas mixtures the relative proportions of iso-butane and normal butane vary, but the ratio of the iso-compound to the normal compound is as a rule considerably higher than in natural gases.

Butanes may be considered as more or less marginal compounds in respect to their desirability in ordinary gasoline, that is, a certain percentage of them is essential for sufficient vapor pressure to insure ease in starting, while an excess tends to produce vapor lock. For these reasons the total percentage of 4-carbon atom hydrocarbons is commonly adjusted in conjunction with the boiling range and vapor pressure of the other gasoline components to produce a gasoline of desirable starting characteristics according to seasonal demands.

The butanes at the present time bear a further important relationship to oil refining in that their excess production is being utilized as a source of gasoline either by ordinary thermal cracking or by special catalytic dehydrogenation processes followed by polymerization in which catalysts may or may not be used. Considering the butenes arising from such dehydrogenation, normal butenes are considerably more difficult to polymerize, either thermally or catalytically, than iso-butene. Further, it is found that also the octenes representing the dimers of isobutene are of higher antiknock value than those from normal butenes which holds also for the octanes produced by hydrogenation. It is, therefore, of considerable importance at the present time to convert as much as possible of the normal butane production into isobutane, and the present invention is especially concerned with a process for accomplishing this object.

In one specific embodiment the present invention comprises a process for producing isobutane from normal butane which comprises contacting said normal butane with a composite of substantially anhydrous chlorides of aluminum and zinc and a porous adsorbent in the presence of a hydrogen halide under isomerizing conditions of temperature and pressure.

We have determined by the use of the class of catalysts mentioned, and particularly by the concurrent use of considerable superatmospheric pressure, that normal butane may be converted into approximately 30–60% of isobutane per pass. Practical yields of isobutane are obtainable at temperatures within the approximate range of 50–350° C. under pressures from substantially atmospheric to approximately 200 atmospheres and preferably of 10–200 atmospheres at temperatures of 125° C. and higher. Besides depressing the volatilization of aluminum chloride from such catalysts, pressure tends also to diminish numerous undesirable side reactions which would result in the formation of hydrogen and of low molecular weight hydrocarbons, so that the reaction proceeds more or less in one direction until an equilibrium is established.

A number of alternative catalyst composites consisting of aluminum chloride, zinc chloride, and substantially inert carrying materials which may be employed in isomerizing normal butane into isobutane according to the process of this invention. While these catalysts may be used more or less interchangeably, some are more effective than others, and accordingly it is not intended to imply that they are definitely equivalent. Extensive experiments have indicated that best results are obtained when a minor percentage of a hydrogen halide, usually in the approximate range of 0.5–10% by volume of the gaseous butane, is present in the reactions. Thus the necessary amount of hydrogen chloride may be introduced directly to the butane undergoing isomerization or produced in situ by addition of small amounts of water or steam, which cause a certain amount of hydrolysis of the substantially anhydrous chlorides.

One of the essential features of the present invention is the use of mixtures of substantially anhydrous chlorides of aluminum and zinc in conjunction with substantially inert, porous granular supports. This use of supports facilitates vapor phase operations at temperatures above the sublimation point of aluminum chloride and apparently in some instances seems to lessen the tendency to the formation of sludges, which have been considered to consist of complex addition compounds, so that the life of the catalyst is extended materially.

When granular aluminum chloride is employed alone in hydrocarbon reactions, it soon tends to agglomerate on account of the formation of adhesive sludge-like materials so that violent agitation is necessary to maintain efficient contact of the catalyst with the reacting hydrocarbons. The addition of zinc chloride to aluminum chloride as hereinafter set forth and the use of carriers with these metal halides decrease side reactions which produce such sludge-like materials, and thereby prolong their life as isomerization catalysts.

Among supporting materials which we have now shown to have practical value as carriers may be mentioned activated carbon, pumice, various types of fullers' earths and clays, particularly those of the montmorillonite or bentonite types, either raw or acid-treated, diatomaceous and infusorial earths, kieselguhr, silica-alumina composites, unglazed porcelain, firebrick, and, in general, relatively dry, refractory, porous substances which have substantially no reactivity with the anhydrous chlorides. It happens frequently that one type of support is better than others, depending upon the ratios of chlorides and support found experimentally to be the best for the furtherance of a particular isomerizing reaction so that it is not to be inferred that the supports can at all times be used interchangeably.

A property of anhydrous aluminum chloride which must be taken into account is its tendency to sublime at a temperature of approximately 180° C., so that if it is employed at temperatures above this point, it must ordinarily be injected or sublimed into the reaction zone.

In the process of the present invention in which the mixture of aluminum chloride and zinc chloride employed is strongly adsorbed by granular material, the enumerated disadvantages of unsupported aluminum chloride are overcome to a large extent since the tendency of aluminum chloride to volatilize is partially counteracted by the adsorbent action of the supports employed, and these supports further act to adsorb and retain some of the viscous addition compounds and prevent the composite granules from adhering to form large agglomerates.

A general method of preparation of the types of granules whose use in paraffin hydrocarbon isomerization, and particularly normal butane isomerization, characterizes the present invention, consists in compositing aluminum chloride and zinc chloride in or upon a substantially inert carrier. This procedure may be carried out by first heating a mixture of the carrier and an aqueous zinc chloride solution to evaporate the water and deposit zinc chloride in and upon the carrier granules. When substantially dry, the carrier so composited with zinc chloride may be dried further in air or in another inert gas. Aluminum chloride may then be added to the carrier-zinc chloride composite and the heating continued in the presence or absence of hydrogen chloride and/or of hydrogen. After treating the granules consisting of carrier and zinc chloride with aluminum chloride, the composite obtained appears dry and the aluminum chloride is present in the pores and on the surface of the composite as evidenced by the violent reaction of the granular material with water and its catalytic activity in organic reactions.

Alternatively a mixture of the desired proportions of substantially anhydrous chlorides of aluminum and zinc may be introduced to a suitable reaction vessel containing a granular carrier or supporting material and therein heated preferably under superatmospheric pressure of hydrogen or another substantially inert gas so as to impregnate the carrier with the mixture of anhydrous chlorides. Obviously the carrier employed in the preparation of any of these composites should be dry when composited with the substantially anhydrous halides in order to avoid loss of active metal halide by hydrolysis. It is also advisable to have hydrogen chloride or another substantially anhydrous hydrogen halide present during the impregnation of the carrier with aluminum chloride and zinc chloride. The hereinabove indicated procedures are typical of the preparation of a number of similar catalytic materials from the metal chlorides and the supports herein mentioned. Also it may at times be advantageous to add small amounts of other metal halides to the composites of aluminum chloride, zinc chloride, and supports.

Although zinc chloride alone has substantially no paraffin isomerizing activity under the hereinabove indicated operating conditions, the addition of zinc chloride to aluminum chloride used for preparing a supported isomerization catalyst increases the isomerizing activity and life over that obtainable with similar catalytic material consisting of aluminum chloride only deposited upon substantially inert supports. In the presence of the supported aluminum chloride-zinc chloride catalyst there is also relatively small formation of propane and pentane from butane by side reactions.

Owing to the adsorptive properties of the supports, catalysts of the above character may be employed in isomerizing normal butane with substantially no tendency for the original particles to run together due to the formation of intermediate sludge-like products, so that much larger quantities of material may be treated before the catalyst has lost its activity. Another advantage resides in the fact that the adsorbed halides will remain in place without volatilization at considerably higher temperatures than the normal sublimation point of aluminum chloride, when normal butane is passed over a stationary bed of the catalyst composite.

The term "activated carbon" as used in the present specification is intended to include any type of prepared carbon or carbonaceous material which is more or less granular and possessed of good porosity and structural strength and which has been prepared by general steps involving the leaching of adsorbed materials from granular residual carbonaceous materials such as wood char and various varieties of coke by mineral acids and by the controlled heating, preferably under vacuum, to expel adsorbed liquids and gases. It is recognized that various forms of active granular chars will vary considerably in adsorptive capacity and, therefore, the properties of catalysts prepared when using them in accordance with the present invention will vary both in respect to the amounts of chlorides of aluminum and zinc which they are able to adsorb and in respect to the periods of service in which they are able to maintain a practical activity in different organic reactions.

The present butane isomerization process may be operated under batch or continuous conditions and either in liquid, mixed, or vapor phase as may be desirable or expedient in view of the particular combination chosen. A simple method of operation consists in adding 5 to 10% of a granular catalyst composite to a treating vessel containing hydrocarbons and provided with a mechanical agitating device of some description. It is preferable to employ a treater which can be sealed from atmospheric contact and which can be operated under pressure if necessary. The solid catalyst is then kept in suspension by moderate agitation while introducing a slow stream of hydrogen chloride, or other hydrogen halide. Addition of hydrogen to the reaction mixture also tends to decrease sludge formation and prolong the life of the catalyst composite employed in isomerization reactions.

In another type of operation which accelerates the rate of isomerization, the hydrocarbon mixture may be kept at its boiling point by moderate heating under reflux conditions with the granular catalyst maintained in suspension by the ebullition, while the hydrogen halide is added in a slow stream. In this type of operation any desired superatmospheric pressure may be employed to permit the use of a desired temperature. In the case of a supported aluminum chloride-zinc chloride composite, the necessary amount of hydrogen chloride may be generated by adding a small amount of water or steam which causes hydrolysis.

Vapor phase isomerization operations may be conducted by passing vapors of hydrocarbons mixed with a small amount of hydrogen chloride over catalyst composites in the form of granules or pellets which are contained in treating chambers or reactors. Addition of hydrogen to such reaction mixtures has a beneficial effect similar to that observed during its use in batch operations.

While the catalyst and process of this invention are particularly useful in isomerizing normal butane into isobutane, they may be used also for isomerizing normally liquid paraffins into more branched isomeric paraffins under conditions of temperature, pressure, and time found to be optimum for the isomerization of the hydrocarbons or hydrocarbon mixtures undergoing treatment.

The following examples are introduced as characteristic of the practical operation of the present process although not with the intention of limiting the scope of the invention in exact correspondence with the numerical data since some latitude is possible in the proportions of adsorbent, aluminum chloride, and zinc chloride; and temperatures and pressures may also be varied within the limits already specified. These variations may be considerable in the case of gas mixtures in which the normal butane content varies over relatively wide ranges.

EXAMPLE I 92 parts by weight of 8–12 mesh activated charcoal was mixed with 15 parts by weight of zinc chloride dissolved in 200 parts by weight of water. The resulting mixture was heated with stirring to evaporate water and leave a substantially dry mixture of charcoal and zinc chloride. The mixture of zinc chloride and charcoal was heated further for 4 hours at 250° C. in a slow stream of nitrogen. Anhydrous hydrogen chloride was then passed over the granular material while the temperature was increased during 1 hour to 380° C. and maintained at that temperature for 2 hours more. The resulting mixture of charcoal and substantially anhydrous zinc chloride was mixed with 45 parts by weight of substantially anhydrous aluminum chloride and heated at 250° C. for 2 hours in the presence of 12 parts by weight of anhydrous hydrogen chloride under an initial nitrogen pressure of 25 atmospheres.

The granular material prepared as hereinabove described and consisting of 30% by weight of aluminum chloride, 10% by weight of zinc chloride, 60% by weight of charcoal was used as a filler in a reactor through which normal butane containing 4% by weight of hydrogen chloride was passed at 200° C. under a pressure of 47 atmospheres. The normal butane, which had been saturated with hydrogen at room temperature at 47 atmospheres pressure was charged at an hourly rate corresponding to 1.1 volumes of liquid butane per volume of catalyst. In a run of 378 hours duration, 32,325 parts by volume of liquid normal butane was contacted with 75 volumes of catalyst and a product was formed with the following average molar composition: propane, 2.1%; isobutane, 40.6%; normal butane, 54.2%; and pentanes 3.1%.

It was calculated that one pound of aluminum chloride catalyzed the formation of 107 gallons of isobutane and 9.1 gallons of pentanes. Based upon one pound of total metal halides present, the yields were 78.9 gallons of isobutane, and 6.7 gallons of pentanes. The calculations as to the gallons of isobutane produced are based upon the amounts of isobutane formed before the conversion of normal butane into isobutane decreased to 20% per pass.

In comparison with this production of 107 gallons of isobutane per pound of aluminum chloride it was found that zinc chloride on charcoal in the absence of aluminum chloride did not isomerize normal butane under the conditions employed with the mixed catalyst; while aluminum chloride itself on charcoal under the same operating conditions catalyzed the formation of only 30 gallons of isobutane per pound of aluminum chloride before the conversion of normal butane to isobutane decreased to 20% per pass.

EXAMPLE II

Methods similar to that used in Example I were employed for producing two composites of aluminum chloride and zinc chloride supported by crushed firebrick of 6–10 mesh particle size. Normal butane containing 4% by weight of hydrogen chloride was passed over these granular composites at 200° C. under a pressure of 650 pounds per square inch using a liquid butane charging rate of 1–1.2 volumes per hour per volume of catalyst space. The compositions of these catalyst composites and the results obtained during their use on normal butane are given in Table I.

TABLE I

*Isomerization of n-butane in the presence of aluminum chloride-zinc chloride-firebrick composites*

|  | I | II |
|---|---|---|
| Catalyst composition, per cent by wt.: | | |
| Aluminum chloride | 22.0 | 24.9 |
| Zinc chloride | 11.8 | 7.5 |
| Firebrick | 66.0 | 67.6 |
| Molal ratio, $AlCl_3:ZnCl_2$ | 1:0.5 | 1:0.3 |
| Hours on test until isomerization decreased to 20% per pass | 138 | 161 |
| Average conversion per pass, mol per cent: | | |
| Propane | 3.7 | 4.8 |
| i-Butane | 29.3 | 35.6 |
| n-Butane | 64.0 | 59.4 |
| Pentane | 3.0 | 4.2 |
| Yields per pound of metal halides in catalyst: | | |
| i-Butane, gallons | 23.1 | 39.5 |
| Pentane, gallons | 2.1 | 5.1 |

Upon the basis of the aluminum chloride contained in the above mentioned catalysts the respective yields of isobutane were 35 to 51 gallons per pound of aluminum chloride. The use of 0.3 mol of zinc chloride per mol of aluminum chloride in connection with the firebrick support had a beneficial effect since aluminum chloride alone supported by firebrick produced 28 gallons of isobutane per pound of aluminum chloride as compared to 51 gallons. The addition of a larger quantity of zinc chloride to aluminum chloride produced a less-active isomerizing catalyst as shown by the results in Table I obtained with the catalyst containing 0.5 mol of zinc chloride.

The character of the present invention and its novelty and utility in producing isobutane from normal butane in the presence of composites of aluminum chloride, zinc chloride, and substantially inert carriers, can be seen from the preceding specification and examples presented, although neither section is intended to unduly limit its generally broad scope.

We claim as our invention:

1. A process for the isomerization of paraffin hydrocarbons to produce therefrom substantial yields of compounds more highly branched than the material subjected to treatment which comprises subjecting said hydrocarbons mixed with a hydrogen halide to contact with a granular preformed composite of substantially anhydrous chlorides of aluminum and zinc and a solid carrier under isomerizing conditions of temperature and pressure.

2. A process for the isomerization of normally liquid paraffin hydrocarbons to produce therefrom substantial yields of compounds more highly branched than the material subjected to treatment which comprises subjecting said hydrocarbons mixed with a hydrogen halide to contact with a granular preformed composite of substantially anhydrous chlorides of aluminum and zinc and a solid adsorbent under isomerizing conditions of temperature and pressure.

3. A process for the isomerization of normal butane to produce therefrom a substantial yield of isobutane which comprises subjecting said normal butane mixed with a hydrogen halide to contact with a granular preformed composite of substantially anhydrous chlorides of aluminum and zinc and a solid adsorbent.

4. A process for the isomerization of normal butane to produce therefrom a substantial yield of isobutane which comprises subjecting said normal butane mixed with a hydrogen halide to contact with a granular preformed composite of substantially anhydrous chlorides of aluminum and zinc and a solid siliceous adsorbent.

5. A process for the isomerization of normal butane to produce therefrom a substantial yield of isobutane which comprises subjecting said normal butane mixed with a hydrogen halide to contact with a granular preformed composite of substantially anhydrous chlorides of aluminum and zinc and activated carbon.

6. A process for the isomerization of normal butane to produce therefrom a substantial yield of isobutane which comprises subjecting said normal butane mixed with a hydrogen halide to contact at a temperature within the approximate range of 50–350° C. with a granular preformed composite of substantially anhydrous chlorides of aluminum and zinc and a solid adsorbent.

7. A process for the isomerization of normal butane to produce therefrom substantial yields of isobutane which comprises subjecting said normal butane mixed with a hydrogen halide to contact at a temperature within the approximate range of 50–350° C. under a pressure of an added gas from substantially atmospheric to approximately 200 atmospheres with a granular preformed composite comprising essentially anhydrous chlorides of aluminum and zinc and a solid adsorbent.

8. A process for the isomerization of normal butane to produce therefrom substantial yields of isobutane which comprises subjecting said normal butane mixed with a hydrogen halide to contact at a temperature within the approximate range of 50–350° C. under a pressure of hydrogen from substantially atmospheric to approximately 200 atmospheres with a granular preformed composite comprising essentially anhydrous chlorides of aluminum and zinc and a solid adsorbent.

9. A process for the isomerization of normal butane to produce therefrom substantial yields of isobutane which comprises subjecting said normal butane mixed with a hydrogen halide to contact at a temperature within the approximate range of 50–350° C. under a pressure of hydrogen from substantially atmospheric to approximately 200 atmospheres with a granular preformed composite comprising essentially anhydrous chlorides of aluminum and zinc and a relatively inert siliceous adsorbent.

10. A process for the isomerization of normal butane to produce therefrom substantial yields of isobutane which comprises subjecting said normal butane mixed with a hydrogen halide to contact at a temperature within the approximate range of 50–350° C. under a pressure of hydrogen from substantially atmospheric to approximately 200 atmospheres with a granular preformed composite comprising essentially activated carbon and substantially anhydrous chlorides of aluminum and zinc.

11. A process for the isomerization of normal butane to produce therefrom substantial yields of isobutane which comprises subjecting said normal butane mixed with a hydrogen halide to contact at a temperature within the approximate range of 50–350° C. under a pressure of hydrogen from substantially atmospheric to approximately 200 atmospheres with a granular preformed composite comprising essentially crushed firebrick and substantially anhydrous chlorides of aluminum and zinc.

12. A process for the isomerization of normal butane to produce therefrom substantial yields of isobutane which comprises subjecting said normal butane mixed with a hydrogen halide to contact at a temperature within the approximate range of 50–350° C. under a pressure of hydrogen from substantially atmospheric to approximately 200 atmospheres with a granular preformed composite comprising essentially diatomaceous earth and substantially anhydrous chlorides of aluminum and zinc.

VLADIMIR N. IPATIEFF.
HERMAN PINES.